(12) United States Patent
Kubo

(10) Patent No.: US 8,241,709 B2
(45) Date of Patent: Aug. 14, 2012

(54) METHOD FOR PRODUCING ELECTRODE HAVING IMMOBILIZED π-CONJUGATED LIGANDS, ELECTRODE HAVING IMMOBILIZED π-CONJUGATED METAL COMPLEXES, AND ELECTRODE HAVING IMMOBILIZED π-CONJUGATED MULTINUCLEAR METAL COMPLEXES

(75) Inventor: Wataru Kubo, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 12/337,456

(22) Filed: Dec. 17, 2008

(65) Prior Publication Data
US 2009/0159449 A1    Jun. 25, 2009

(30) Foreign Application Priority Data

Dec. 20, 2007 (JP) ................. 2007-328717
Oct. 31, 2008 (JP) ................. 2008-281861

(51) Int. Cl.
B05D 1/18 (2006.01)
B05D 5/12 (2006.01)
C25D 11/00 (2006.01)

(52) U.S. Cl. .......... 427/430.1; 427/113; 427/443.2; 205/317

(58) Field of Classification Search ........ 427/430.1, 427/113, 443.2; 205/317
See application file for complete search history.

(56) References Cited

U.S. PATENT DOCUMENTS

2007/0120121 A1* 5/2007 Lee et al. ............. 257/40
2007/0122689 A1   5/2007 Kubo et al.
2007/0289872 A1* 12/2007 Deniau et al. .......... 205/157

FOREIGN PATENT DOCUMENTS

| JP | 59141055 A | * | 8/1984 |
| JP | 11-501209 A |  | 2/1999 |
| JP | 2007-121280 A |  | 5/2007 |
| WO | WO96/25514 A1 |  | 8/1996 |

OTHER PUBLICATIONS

Gonzalez-Romero et al., "Effects of Sodium Dodecyl Sulfate, SDS, Micelles on the Electrochemical Behavior of a Model Arenediazonium Ion. 2. Estimation of the Association Constant of the Electrochemically Generated Aryl Radicals with SDS Micelles", Langmuir (no month, 2002), vol. 18, pp. 10311-10317.*

Liu et al., "An Interface Comprising Molecular Wires and Poly(ethylene glycol) Spacer Units Self-Assembled on Carbon Electrodes for Studies of Protein Electrochemistry", Langmuir (no month, 2006), vol. 22, pp. 7421-7430.*

Aramata et al., "Ligand Grafting Method for Immobilization of Metal Complexes on a Carbon Electrode", Thin Solid Films (no month, 2003), vol. 424, pp. 239-246.*

(Continued)

*Primary Examiner* — Edna Wong

(74) *Attorney, Agent, or Firm* — Canon U.S.A., Inc., IP Division

(57) ABSTRACT

A method for producing an electrode having immobilized π-conjugated ligands is provided. The method includes bringing an aqueous solution into contact with an electrically conductive base material, the aqueous solution including π-conjugated ligands and at least one of (i) a surfactant, and (ii) a water-soluble molecule having a structure different from that of the π-conjugated ligands, the water-soluble molecule having a π-conjugated structure, and immobilizing the π-conjugated ligands on the base material.

6 Claims, 11 Drawing Sheets

OTHER PUBLICATIONS

Rocklin et al., "Chemically Modified Carbon Electrodes Part XVII. Metallation of Immobilized Tetra(aminophenyl)porphyrin with Manganese, Iron, Cobalt, Nickel, Copper and Zinc, and Electrochemistry of Diprotonated Tetraphenylporphyrin", J. Electroanal. Chem. (no month, 1979), vol. 100, pp. 271-282.*

Ronald Blankespoor, Benoit Limoges, Bernd Schollhorn, Jean-Laurent Syssa-Magale and Dounia Yazidi, "Dense Monolayers of Metal-Chelating Ligands Covalently Attached to Carbon Electrodes Electrochemically and Their Useful Application in Affinity Binding of Histidine-Tagged Proteins", Langmuir, vol. 21, No. 8, 2005, pp. 3362-3375, no month.

* cited by examiner

FIG. 1A
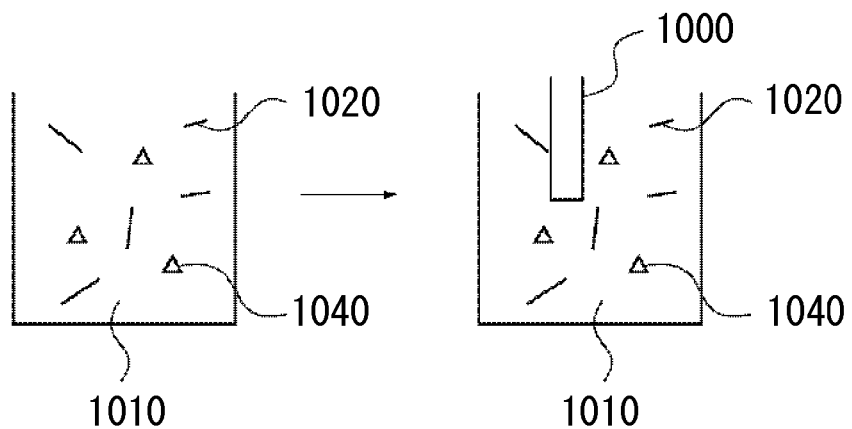
FIG. 1B-1  FIG. 1B-2
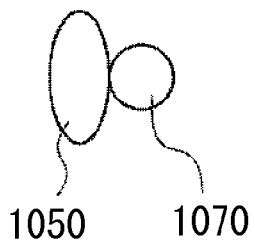 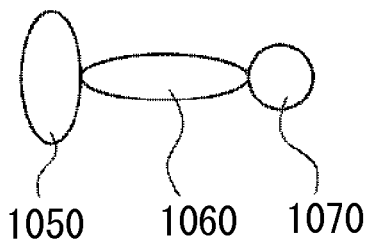
FIG. 1C
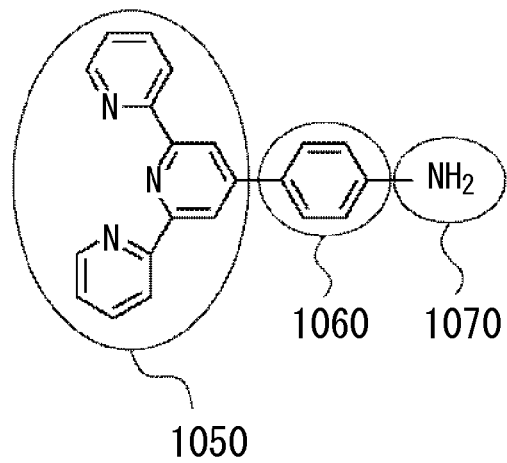
FIG. 1D
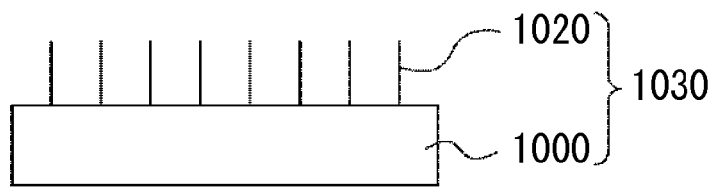

1

METHOD FOR PRODUCING ELECTRODE HAVING IMMOBILIZED π-CONJUGATED LIGANDS, ELECTRODE HAVING IMMOBILIZED π-CONJUGATED METAL COMPLEXES, AND ELECTRODE HAVING IMMOBILIZED π-CONJUGATED MULTINUCLEAR METAL COMPLEXES

BACKGROUND OF THE INVENTION

1. Field of the Invention

The present invention generally relates to a method for producing an electrode having immobilized π-conjugated ligands, an electrode having immobilized π-conjugated metal complexes, and an electrode having immobilized π-conjugated multinuclear metal complexes.

2. Description of the Related Art

A method of immobilizing a π-conjugated metal complex having a thiol group on a base material of gold by a gold/thiol bond has been used for obtaining an electrode having immobilized π-conjugated metal complexes, for example for use in molecular wiring and the like.

However, there may only be a limited number of base materials on which a metal complex can be immobilized with this method, and the method may also result in a relatively low bond stability of the gold/thiol bond at a negative potential in an aqueous solution.

A method for immobilizing a diazonium-modified ligand on a carbon electrode by electro-reduction has been described in Langmuir 2005, 21, 3362-3375.

However, even when an aqueous solution containing a diazonium-modified ligand is electrolytically reduced, and a π-conjugated ligand is immobilized on a carbon electrode, by the method described in Langmuir 2005, 21, 3362-3375, no electric current caused by oxidation and reduction of a complex can be observed in the obtained electrode having the complex immobilized thereon.

SUMMARY OF THE INVENTION

In one embodiment according to the present invention, a method for producing an electrode having immobilized π-conjugated ligands is provided. The method includes bringing an aqueous solution into contact with an electrically conductive material, the aqueous solution having π-conjugated ligands and at least one of (i) a surfactant, and (ii) a water-soluble molecule having a structure different from that of the π-conjugated ligands, the water soluble molecule having a π-conjugated structure. The method also includes immobilizing the π-conjugated ligands on the base material.

In another embodiment according to the present invention, a method for producing an electrode having immobilized π-conjugated metal complexes is provided. The method includes preparing an electrode having immobilized π-conjugated ligands; and bringing a solution having metal ions into contact with the electrode having immobilized π-conjugated ligands. The electrode having immobilized π-conjugated ligands may be that prepared by the above-described method for producing an electrode having immobilized π-conjugated ligands.

In yet another embodiment according to the present invention, a method for producing an electrode having an immobilized π-conjugated multinuclear metal complexes is provided. The method includes preparing an electrode having immobilized π-conjugated metal complexes; bringing a solution having ligands that can be coordinated to a plurality of metal ions into contact with the electrode having immobilized π-conjugated metal complexes; and after bringing the solution having the ligands that can be coordinated with a plurality of metal ions into contact with the electrode, further bringing the electrode into contact with a solution including metal ions. The electrode having immobilized π-conjugated metal complexes may be that prepared by the above-described method for producing an electrode having immobilized π-conjugated metal complexes.

Further features of the present invention will become apparent from the following description of exemplary embodiments with reference to the attached drawings.

BRIEF DESCRIPTION OF THE DRAWINGS

FIGS. 1A to 1D show an example of an electrode having immobilized π-conjugated ligands and a π-conjugated ligand.

DESCRIPTION OF THE EMBODIMENTS

Figure 2:
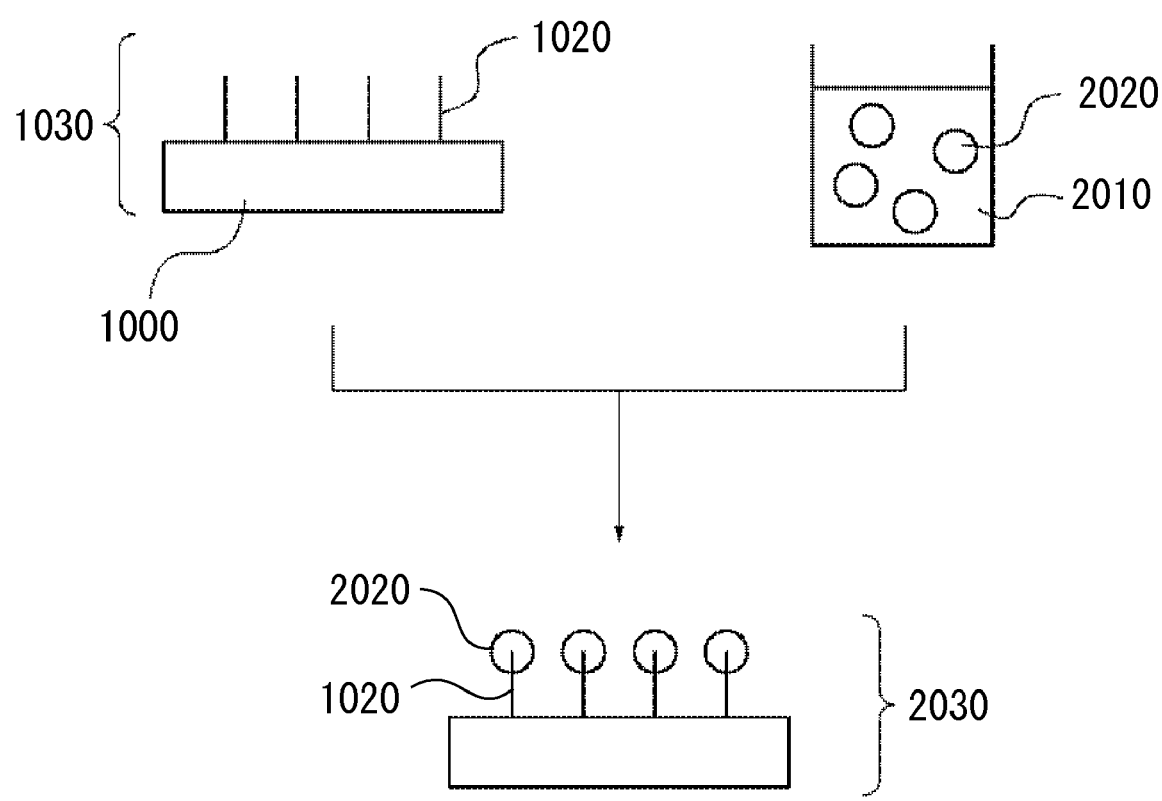
FIG. 2 illustrates an embodiment of a method for fabricating an electrode having immobilized π-conjugated metal complexes.

The present inventor's examination for the electrode obtained by the method described in Langmuir 2005, 21, 3362-3375 suggested that diazonium-modified π-conjugated ligands in an aqueous solution can form associations due to a π-π interaction, hydrophobic-hydrophobic interaction, and the like, and thus may be tightly immobilized on the base material, thereby substantially eliminating the space where metal ions can be coordinated. Accordingly, with the electrode obtained by the method described in Langmuir 2005, 21, 3362-3375, there remains a need for an improved method of forming such a complex on a base material from the point of view of the present inventor. Namely, there remains a need for a method of forming a complex on a base material in which associations of π-conjugated ligands are reduced or even eliminated to keep a space between the π-conjugated ligands.

A first aspect of the present invention relates to a method for producing an electrode having immobilized π-conjugated ligands. The method may generally comprise:

(i) bringing an aqueous solution into contact with an electrically conductive base material, the aqueous solution comprising π-conjugated ligands and at least one of (i) a surfactant, and (ii) a water-soluble molecule having a structure different from that of the π-conjugated ligands, the water-soluble molecule having a π-conjugated structure; and (ii) immobilizing the π-conjugated ligands on the base material.

The method according to the first aspect in accordance with the present invention will be described below with reference to the appended drawings.

In step (i), as shown for example in the embodiment of FIG. 1A, an aqueous solution 1010 including π-conjugated ligands 1020, and at least one of a surfactant and a water-soluble molecule 1040 having a π-conjugated structure, is brought into contact with a base material 1000. The term "additive" 1040 as used hereinbelow is intended to refer to either or both of the surfactant and the water soluble molecule having the π-conjugated structure.

The embodiment illustrated by FIG. 1A depicts an example where a solution including the additive 1040 and the π-conjugated ligands 1020 is produced, and then the base material is immersed in the solution. However, it is noted that this sequence of operations is not intended to be limiting, and methods in accordance with the invention may include other sequences of operation, provided that the solution and base material are brought into contact with each other. For example, the additive and π-conjugated ligands may be introduced in a solution into which the base material has already been immersed, or the π-conjugated ligands may be introduced into a solution of the additive after the base material has been immersed therein.

In one embodiment, the aqueous solution 1010 may be used in immobilizing the π-conjugated ligands 1020 on the surface of the base material 1000, and includes at least one of the surfactant and the water-soluble molecule 1040 having a π-conjugated structure, as well as the π-conjugated ligands 1020. Water may be the main component of the aqueous solution 1010. Optionally, the aqueous solution 1010 may also contain substances other than the above-described molecules. For example, one or more of an organic solvent, a salt, and another compound may be also included in the aqueous solution, with the object of, for example, improving solubility or stability of the π-conjugated ligand, or more efficiently immobilizing the π-conjugated ligand on the base material.

In one embodiment, as shown in FIG. 1B-1, the π-conjugated ligand 1020 may have a moiety 1050 for coordinating to a metal ion and a moiety 1070 for binding to a base material. Furthermore, as shown in FIG. 1B-2, the ligand may also optionally have a moiety 1060 that connects the moiety 1050 for coordinating to a metal ion to the moiety 1070 for binding to a base material. FIG. 1C shows an embodiment of a specific molecule having examples of each of the moieties depicted in FIG. 1B-2.

According to one embodiment of the present invention, the moiety 1050 for coordinating to a metal ion is capable of coordinating a metal ion to the π-conjugated ligand 1020 immobilized on the base material 1000 by the following process (further described below as a second aspect of the present invention). Examples of the moiety for coordinating to a metal ion may be groups comprising at least one of bipyridine, terpyridine, phenanthroline, porphyrin, phthalocyanine, and derivatives thereof. In one version, the π-conjugated ligands comprise molecules comprising at least one of terpyridine, bipyridine, and derivatives thereof.

According to one embodiment, the moiety 1070 for binding to the base material serves to immobilize the π-conjugated ligand 1020 on the base material in step (ii) described above. Examples of the moiety 1070 for binding to the base material may include at least one of a diazonium group and an amino group. In one version, the moiety for binding to the base material in step (ii) may become such a moiety after being converted by some method. For example, in a version where a moiety for binding to the base material is an amino group, it may be converted into a diazonium group and a nitrogen molecule may thereafter be detached for binding to the base material. In other words, in one version a π-conjugated ligand may be converted to a diazonium compound, and may then be bound to the base material. Thus, in one version, the π-conjugated ligands can comprise a diazonium compound.

In a further embodiment, the moiety 1060, which connects the moiety 1050 for coordinating to a metal and the moiety 1070 for binding to a base material, may be capable of connecting the moiety 1050 for coordinating to a metal and the moiety 1070 for binding to a base material, by a π-conjugated structure. It is believed that where the moiety 1060, which connects the moiety 1050 for coordinating to a metal ion and the moiety 1070 for binding to a base material, is a π-conjugated structure, it may be the case that when the π-conjugated ligand is coordinated to a metal and forms a complex in the subsequent process (e.g., according to a second aspect of the present invention), electrons may be able to relatively rapidly move from the central metal of the complex to the base material.

Examples of suitable π-conjugated ligands that do not include a moiety for connecting the moiety for coordinating to a metal ion to the moiety for binding to the base material can include at least one of 4'-amino-2,2':6',2"-terpyridine, 4,4',4"-triamino-2,2':6',2"-terpyridine, 4,4'-diamino-2,2'-bipyridine, 4-amino-2,2'-bipyridine, 5,6-diamino-1,10-phenanthroline, and 5-amino-1,10-phenanthroline. Examples of suitable π-conjugated ligands that do include a moiety connecting the moiety for coordinating to a metal ion to the moiety for binding to the base material can include at least one of 4'-(4-aminophenyl)-2,2':6',2"-terpyridine, diaminobathophenanthroline, and aminobathophenanthroline.

In one version, the concentration of the π-conjugated ligands in the aqueous solution may be equal to or higher than 0.013 mM and equal to or lower than 1.3 mM.

In accordance with embodiments of the present invention, and in the present description, a ligand described as a π-conjugated ligand may be immobilized on a base material and, according to the second aspect of the present invention, may be coordinated to a metal ion. Therefore, both the ligand before it is added to a solvent forming the solution, and the ligand after it has been added to the solvent, can be described as the π-conjugated ligand. When the structure after the addition to the solvent is different from that prior to the addition, the π-conjugated ligand before it is added to the solvent may be described as the first π-conjugated ligand, and the π-conjugated ligand after it has been added to the solvent may be described as the second π-conjugated ligand.

In one embodiment, the additive 1040 may be capable of immobilizing the π-conjugated ligands 1020 to the base material, so that the π-conjugated ligands 1020 have a certain spacing therebetween. The additive may be at least one of (i) a surfactant and (ii) a water-soluble molecule having a π-conjugated structure, and these additives may also be used individually or together. In accordance with embodiments of the present invention, the case using the description of "including at least one of A and B" includes the case in which A is included, the case in which B is included, and the case in which both A and B are included. Furthermore, the additive may also be a molecule having properties of both aforementioned substances (e.g., a water-soluble molecule having a π-conjugated structure and also having a surfactant function).

According to one aspect of the invention, it is believed that when an amphiphilic surfactant is used as the additive 1040, the π-conjugated ligands 1020 that may form associations due to hydrophobic interaction between the molecules or π-π interactions in an aqueous solution, may have improved affinity for a water-soluble solvent, and thus can be comparatively uniformly distributed in the liquid. As a result, it may be possible to prepare an electrode having immobilized π-conjugated ligands in which the spacing between the π-conjugated ligands is larger than that in the case in which no surfactant is added. In one version, the surfactant may comprise at least one of ionic and nonionic surfactants. Examples of the former may include, but are not limited to, at least one of sodium dodecylsulfate and sodium deoxycholate, and examples of the latter may include, but are not limited to, polyoxyethylene alkylphenyl ethers.

According to yet another aspect of the invention, when a water-soluble molecule having a π-conjugated structure is used as the additive 1040, the water-soluble molecule having a π-conjugated structure is believed to function as follows. The water-soluble molecule having a π-conjugated structure is a molecule having a π-conjugated structure that can also be dissolved in an aqueous solution. A water-soluble molecule having a π-conjugated structure may be capable of penetrating between the π-conjugated ligands 1020 that have formed associations by hydrophobic interaction between the molecules or π-π interaction in an aqueous solution. As a result, it may be possible to prepare an electrode having immobilized π-conjugated ligands in which the spacing between the π-conjugated ligands is larger than that in the case in which a water-soluble molecule having a π-conjugated structure is not added. Further, the water-soluble molecule having a π-conjugated structure has a molecular structure that is different from that of the π-conjugated ligand 1020. Moreover, in one version, the π-conjugated structure of the water-soluble molecule may be different than the π-conjugated structure of the π-conjugated ligand. Where the water-soluble molecule having a π-conjugated structure has a structure different than that of the π-conjugated ligand, stacking of the water-soluble molecules having a π-conjugated structure and the π-conjugated ligands may become more difficult, and thus the π-conjugated ligands can be immobilized with a certain spacing therebetween. Examples of the water-soluble molecule having a π-conjugated structure may include, but are not limited to, at least one of benzenesulfonic acid and derivatives thereof, benzenesulfonates and derivatives thereof, polyoxyethylene alkylphenyl ethers, phenylpolyoxyethylene and derivatives thereof, benzoic acid and derivatives thereof, benzoic acid salts and derivatives thereof, aniline and derivatives thereof, (excluding those having a pyridine ring in the molecule), acid salts of aniline and derivatives thereof (excluding those having a pyridine ring in the molecule), phenylphosphoric acid and derivatives thereof, and phenylphosphates and derivatives thereof. The expression "water-soluble" as used herein means the ability to dissolve at 0.013 mM or more in water at 20° C. under 1 atm. Furthermore, when the water-soluble molecule having a π-conjugated structure remains in the immobilized π-conjugated ligand molecule, in one version it may be the case that the water-soluble molecule is smaller than the π-conjugated ligand, so that the coordination of a metal to the π-conjugated ligand is not excessively spatially hindered.

In one version, after the electrode having immobilized π-conjugated ligands has been produced, the water-soluble molecule having a π-conjugated structure may be removed by elution, or may be left on the electrode, provided for example that it does not excessively hinder the coordination of the ligand with a metal ion in the method according to the second aspect of the present invention.

The concentration of the additive that is added to the solution can be appropriately selected according to, for example, at least one of the type of the base material, type of the additive, type of the π-conjugated ligand, and type of the aqueous solvent. For example, the concentration of the additive may include a total weight of the surfactant molecules of equal to or higher than 0.1 and equal to or lower than 1, and a total weight of the water-soluble molecules having a π-conjugated structure of equal to or higher than 100 and equal to or lower than 100,000, where the total weight of the π-conjugated ligand molecules in the aqueous solution is taken as 1.

According to an embodiment of the invention, the base material 1000 has electric conductivity and is an object of immobilization of the π-conjugated ligand 1020. In the below-described method according to the second aspect of the present invention, the base material may be capable of passing an electric charge acquired in the electron transfer reaction among the metal complex molecules to an external circuit. The base material may have any shape. For example, the base material may have one or more of a flat shape such as a plane, a shape having a curved surface, and a spherical shape. In one version, the base material having electric conductivity can comprise a conductive material that has sufficient electrochemical stability under the conditions at which the electrode is used. For example, the base material can comprise, and even be formed entirely from, a material including at least one of metals, conductive polymers, metal oxides, and carbon materials. In one version, the base material comprises a carbon material, for example to provide a wide electric potential window in the aqueous solution, a low background potential, stability, and cost. The carbon material as referred to herein may be a material that comprises mainly carbon atoms. However, this definition may also include derivatives of materials comprising, consisting essentially of, or consisting only of carbon, as well as materials formed of carbon atoms in which a material formed of carbon atoms is dispersed, provided for example that the electric conductivity and electrochemical stability of such materials are about the same or similar as those of material formed of only carbon atoms. Examples of the material formed of only of carbon can include, but are not limited to, graphite, conductive graphite, electron cyclotron sputtering carbon, diamond-like carbon, fullerenes, carbon nanotubes, and carbon nanohorns. Examples of derivatives of materials formed of only carbon include carbon electrodes having a functional group (for example, a carboxylic acid group) as a result of surface treatment (for example, heat treatment or acid treatment), such as glassy carbon. Examples of materials having dispersed therein a material formed of carbon atoms include materials printed with a carbon paste.

In one version, a porous material may be used for the base material. Where a porous material is used, the surface area can be enlarged and the current value may thus be increased. The base material 1000 can also have a one-layer configuration or a multilayer configuration in which the outermost layer is electrically conductive. In the latter case, the configuration can be produced, for example, by forming a conductive layer on a layer comprising an electrically insulating substance. Examples of electrically insulating substances can include at least one of glass and polymers. Examples of methods suitable for forming the conductive layer can include at least one of vapor deposition, sputtering, and printing. The base material may also optionally be surface treated prior to immobilizing the π-conjugated ligand on the base material. Examples of suitable surface treatment can include at least one of polishing, UV-ozone treatment, acid washing, and electrolytic polishing.

According to one embodiment, in step (ii), the π-conjugated ligands are immobilized on the base material, and an electrode having immobilized π-conjugated ligands, such as that shown in the embodiment of FIG. 1D, is obtained.

In one version, the π-conjugated ligand 1020 can be immobilized on the base material 1000 by using the moiety of the π-conjugated ligand that serves for binding to the base material. For example, immobilization on the base material surface can be performed by inducing a chemical reaction or the like of the moiety of the π-conjugated ligand that serves for binding to the base material. Examples of the method for inducing such chemical reaction may include at least one of the application of an electric potential, irradiation with electromagnetic waves (including light), and addition of a reagent.

In one version, when an electric potential is applied, the moiety of the π-conjugated ligand present on the electrode surface that serves for binding to the base material may be electrolytically reduced (e.g., electrochemically reduced) thereby making it possible to immobilize the π-conjugated ligand on the base material. Accordingly, in one version, the π-conjugated ligands may be immobilized on the base material by electro-reduction.

In another version, when the reaction is induced by bringing the reagents into contact, the step (i) and step (ii) may proceed simultaneously. Accordingly, in one version, immobilization of the π-conjugated ligands on the base material may occur simultaneously with bringing the aqueous solution into contact with the base material. Such a case may be realized, for example, when the aqueous solution and base material are brought into contact with each other in an electrolyzed state.

After this process, the base material may optionally be washed. The π-conjugated ligand can thus be immobilized on the base material by at least the steps (i) and (ii).

The second aspect of the present invention will be described below.

The second aspect of the present invention relates to a method for producing an electrode having immobilized π-conjugated metal complexes. The method generally includes:

(I) bringing a base material into contact with an aqueous solution including π-conjugated ligands and at least one of (i) a surfactant, and (ii) a water-soluble molecule having a structure different from that of the π-conjugated ligand, the water-soluble molecule having a π-conjugated structure;

(II) immobilizing the π-conjugated ligands on the base material; and (III) forming complexes of the π-conjugated ligands immobilized on the base material with metal ions.

Of the steps (I) and (II) of the method according to the second aspect of the present invention, the step (I) may be identical to the step (i) in the method according to the first aspect of the present invention and the step (II) may be identical to the step (ii) in the method according to the first aspect of the present invention. Accordingly, the step (III) will be described below with reference to the drawings.

In step (III), a complex is formed of a metal ion and the π-conjugated ligand of the electrode having immobilized π-conjugated ligands, which has been formed for example by the method according to the first aspect of the present invention.

This step (III) will be described below with reference to FIG. 2.

In one embodiment, the electrode 1030 having immobilized π-conjugated ligands, which may be formed for example by the method according to the first aspect of the present invention, is brought into contact with the aqueous solution 2010 including metal ions 2020, and an electrode 2030 having immobilized π-conjugated metal complexes may be formed thereby. In this process, in order to coordinate the metal ions 2020 to the π-conjugated ligands 1020, a variety of optional treatments can also be performed according to the type of ligand molecules and metal ions, in addition to bringing the solution into contact with the electrode having immobilized π-conjugated ligands. Examples of such treatments can include types of treatment that enhance the coordination of the metal ion to the ligand. Specific examples may include at least one of heating, stirring, application of an electric potential, and irradiation with electromagnetic waves (including microwaves). Further, the base material can also optionally be washed after the process.

In one version, a substance capable of dissolving a metal salt that serves as a source to supply metal ions may be used as the solvent of the solution 2010. Examples of such a substance can include at least one of water, organic solvents such as alcohol, and mixtures thereof. In one version, metal salts may be provided for which an anion constituting the salt may be easily detached during coordination to the ligand. Specific examples can include at least one of halogenides such as chlorides, boron tetrafluoride, and hexafluorophosphates.

Examples of the metal ion that forms a complex having the π-conjugated ligand of the electrode can include ions of at least one of Cu, Sn, Ni, Co, Os, Fe, Ru, V, Mo, Cr, Mn, Pt, Rh, Ir, Ti, Zr, Nb, W, and Sn. For example, in one version the metal ions comprise ions of at least one of Cu, Sn, Ni, Co, Os, and Fe, which ions may have a relatively high complex forming ability.

In yet another embodiment, ligands can be further coordinated to the metal ions of the electrode having immobilized π-conjugated metal complexes that was obtained in step (III). In such a case, the π-conjugated ligand immobilized in step (II) (e.g., π-conjugated ligand of the electrode having immobilized π-conjugated ligands) can be called ligand (A), and the ligand further coordinated to the metal ion can be called ligand (B). The ligand (B) may be at least one of a π-conjugated ligand and a ligand other than a π-conjugated ligand. When a π-conjugated ligand is used as the ligand (B), the ligand can comprise, for example, at least one of terpyridine, bipyridine, and derivatives thereof. When a ligand other than a π-conjugated ligand is used, the ligand can comprise, for example, at least one of a chloride ion and a boron tetrafluoride ion. In one version, the ligand (B) can be coordinated to the metal ion of the electrode having immobilized π-conjugated metal complexes by a method of bringing a solution including the ligand (B) into contact with the electrode having immobilized π-conjugated metal complexes.

In one embodiment, when a π-conjugated metal complex is used as a mediator of an electrochemical reaction, by selecting the ligand (B) in relation to the electric potential, it may be possible to change the redox potential of the complex and adjust it to a suitable potential region.

In yet another embodiment, the ligand (B) may also be a ligand that can be coordinated to a plurality of metal ions in a molecule, and can form an electrode having immobilized π-conjugated multinuclear metal complexes. The electrode with immobilized π-conjugated multinuclear metal complexes can be obtained by coordinating the ligands (B) to a plurality of ions on the electrode having immobilized π-conjugated metal complexes, and then further bringing the electrode into contact with a solution containing metal ions. In one version, there may be two or more metal ion coordination sites per molecule in the π-conjugated multinuclear metal complex of such an electrode having immobilized π-conjugated multinuclear metal complexes. For example, where an application for molecular wirings is considered, two sites and a laminated configuration may be provided. Examples of such ligands that can be coordinated with a plurality of metal ions can include at least one of 4,4''''-(1,4-phenylene)bis(2,2':6', 2''-terpyridine) and tetra-2-pyridinylpyrazine. According to one embodiment, when such π-conjugated multinuclear metal complexes are formed, a plurality of metal centers contained in the π-conjugated multinuclear metal complexes may comprise the same or different elements.

In one version, the immobilized amount of immobilized π-conjugated ligand in the produced electrodes having the immobilized π-conjugated metal complex can be estimated by the following methods.

For example, at least one of electrochemical measurements, UV-vis spectral measurements, IR measurements, microscopic observations, a quartz oscillator microbalance method, ellipsometry, and analytical method for identifying elements can be used. In one version electrochemical measurements are used, because they can be carried out in a relatively simple manner.

In the case of electrochemical measurements, the measurements may be performed on the electrode having the immobilized π-conjugated metal complexes. Due to the coordinated central metal, a redox current different from the redox behavior of the ligand alone, such as a redox current caused by oxidation and reduction of the central atom, may be observed. As a result, the possibility of forming a complex can be estimated.

UV-vis spectral measurements may also be a relatively simple procedure. With this procedure, a spectrum based on light absorption of the complex is observed following the formation of the complex, whereby the possibility of forming a complex can be estimated. In a version where direct information is to be obtained, a microscope maybe useful. The formation of a complex can be estimated by performing microscopic observations with at least one of a scanning tunnel microscope, atomic force microscope, and the like.

A method for measuring the redox charge amount by using a cyclic voltammetry method will be described below as a specific example of methods for estimating the formation of a complex.

Figure 3:
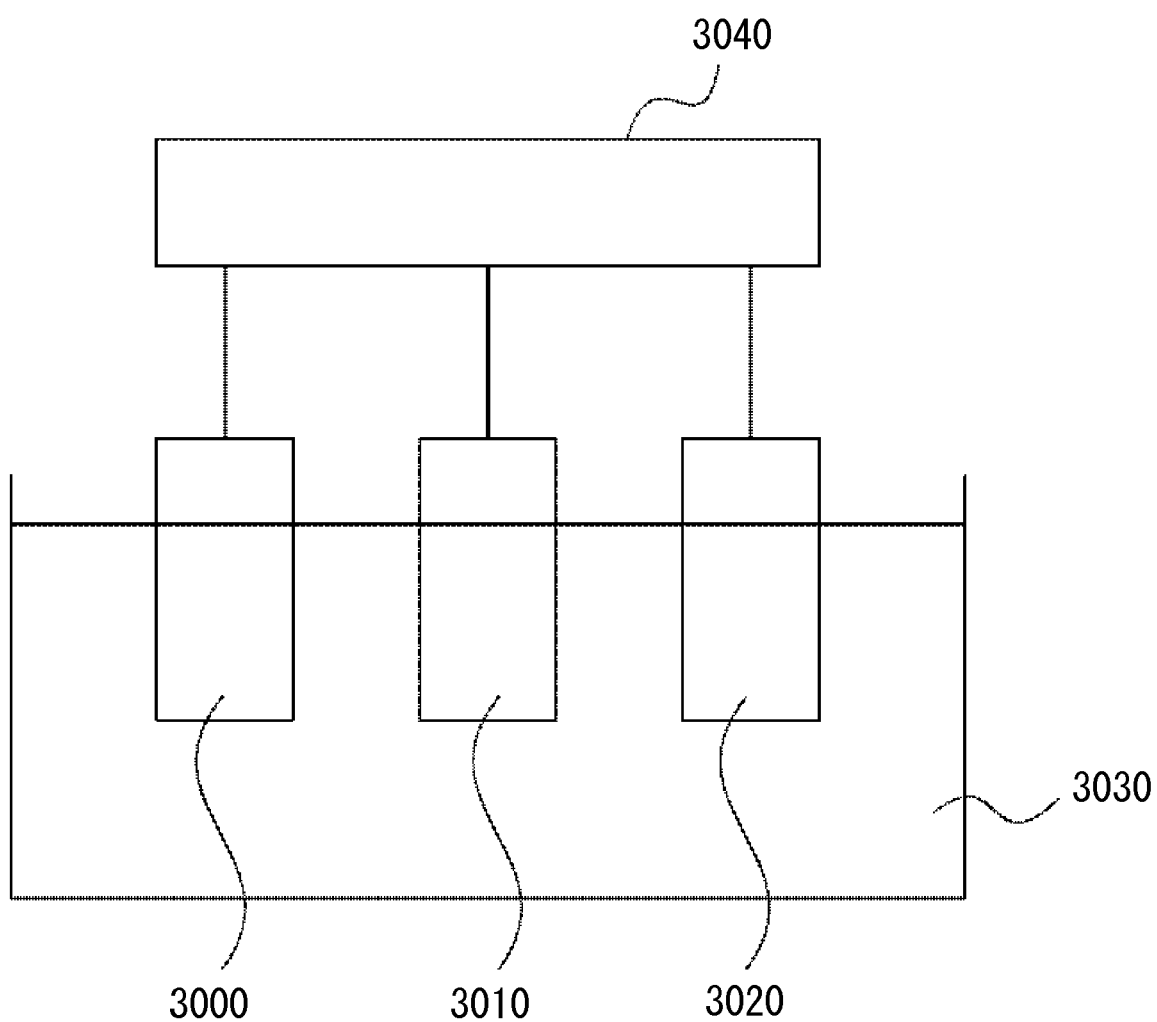
FIG. 3 shows an example of a device for measuring electrochemical properties of an electrode having immobilized π-conjugated metal complexes.

FIG. 3 is an example of a device for measuring electrochemical characteristics of a substrate having an immobilized π-conjugated metal complex. In the figure, the reference numeral 3000 stands for a working electrode, 3010—a reference electrode, and 3020—a counter electrode. These electrodes are immersed in an electrolytic solution 3030. The electrodes are connected to a potentiostat 3040.

In one embodiment, cyclic voltammogram measurements may be performed using the prepared electrode having the immobilized π-conjugated metal complexes as a working electrode, and employing the reference electrode and counter electrode. The measurements may be carried out within an electric potential range including the electric potential region where the central metal of the complex is oxidized and reduced, and the electric charge amount in the peak of the observed voltammogram may be calculated. The adsorption density G (mol cm$^{-2}$) is represented by the following formula:

$$G=Q/nFA,$$

where Q(C) is the electric charge amount, n—a number of reaction electrons, F (Cmol$^{-1}$)—a Faraday constant, and A (cm$^2$)—an electrode surface area.

In addition to using the electrode having immobilized π-conjugated metal complexes as the working electrode, a typical electrode combination can also be used in the device for measuring electrochemical characteristics. In one embodiment of such a typical electrode combination, a silver/silver chloride electrode, a saturated calomel electrode, and an Ag/Ag$^+$ electrode can be used as the reference electrode, and a Pt electrode can be used as the counter electrode.

To provide suitable use in combination with biomaterials, aqueous solutions are most often provided as electrolytes in devices for measuring electrochemical characteristics. When the observations are focused on electron transfer characteristics of the complex, an organic solvent may also sometimes be used for the purposes of electrochemical stability and the like. For example, acetonitrile may be used as the organic solvent. A support salt may also be used to impart conductivity to the electrolyte and enhance the electrochemical reaction. In one version, the support salt may have sufficient solubility in a solvent to impart a function of charge compensation during electron transfer in the complex, in addition to imparting the sufficient conductivity to the electrolyte. Specific examples of the electrolyte may include various buffer solutions, such as an aqueous solution of sodium chloride and a phosphate buffer solution, and an acetonitrile solution of tetrabutylammonium tetrafluoroborate.

EXAMPLES

Aspects of the present invention will be described below in greater detail with reference to the Examples, but the method in accordance with the present invention is not intended to be limited to only these Examples.

Example 1

Preparation of π-Conjugated Ligand

The first π-conjugated ligand represented by Formula (1) was synthesized.

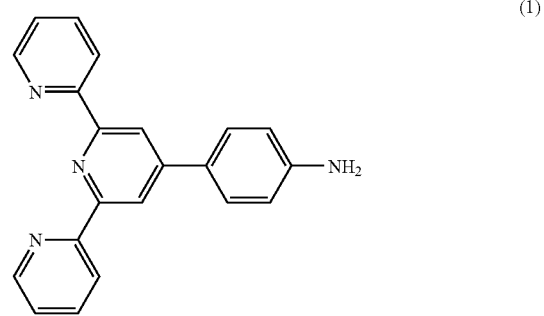

(1)

4-Acetamidobenzaldehyde and 2-acetylpyridine were added at a molar ratio of 1:2 to an N,N-dimethylacetamide solution, an excess amount of ammonium acetate was added, and the reaction was conducted under heating. The reaction liquid was cooled, a sodium hydroxide solution was added, and a purified precipitate was recovered. Hydrobromic acid was added to the recovered substance, followed by heating, cooling, and neutralizing. The first π-conjugated ligand represented by Formula (1) was synthesized by recrystallization of the purified precipitate. The identification was performed by $^1$HNMR and $^{13}$CNMR.

A hydrochloric acid solution of the first π-conjugated ligand represented by Formula (1) was then prepared. An aqueous solution of sodium chlorite was prepared in a molar amount that was by a factor of 1.2 larger than that of the first π-conjugated ligand represented by Formula (1). The two were mixed and reacted under ice cooling and the π-conjugated ligand represented by Formula (1), in which an amino group was replaced with a diazonium group (i.e., a diazonium compound of the π-conjugated ligand represented by Formula (1)), was obtained as the second π-conjugated ligand (ligand (A)).

Example 2

Preparation of Electrode having Immobilized π-Conjugated Ligands (1) Preparation of Base Material A glassy carbon sheet was prepared, the surface thereof was polished, washed with water, and dried, and then UV—ozone treatment was performed to obtain a base material composed of a carbon material.

(2) Preparation of Aqueous Solution

An aqueous solution was prepared by diluting the second π-conjugated ligand obtained in Example 1 with a phosphoric acid buffer solution of hydrochloric acid or an additive.

The following substances were used as the additive: (i) TRITON X-100 (trade name), (ii) sodium dodecylsulfate, (iii) sodium deoxycholate, (iv) sodium benzenesulfonate, and (v) aniline. Among them, substances (ii), (iii) are surfactants, substances (iv), (v) are molecules having a π-conjugated structure, and substance (i) is a water-soluble molecule having a π-conjugated structure that also can function as a surfactant.

When aniline was used as the additive, a mixture of the aniline and the second π-conjugated ligand prepared in Example 1 was used instead of the molecule represented by Formula (1) above.

(3) Immobilization of π-Conjugated Ligand

A cell was configured by using the base material prepared in (1) as a working electrode, the aqueous solution prepared in (3) as an electrolyte, and a platinum wire as a counter electrode, and electro-reduction was performed by applying an electric potential with a potentiostat under ice cooling and nitrogen atmosphere. The electro-reduction immobilized the second π-conjugated ligands on the working electrode surface, and a first electrode having immobilized π-conjugated ligands was obtained. The first electrode having immobilized π-conjugated ligands obtained was then washed with water.

Example 3

(1) Fabrication of Electrode having Immobilized π-Conjugated Metal Complexes

The following compounds were used as metal salts: NaAuCl$_4$, RuCl$_3$, H$_2$PtCl$_6$, AgNO$_3$, TiCl$_4$, MnCl$_2$, ZrCl$_4$, NiCl$_2$, SnCl$_4$, Cr(ClO$_4$)$_3$, Cu(ClO$_4$)$_2$, VCl$_3$, Fe(BF$_4$)$_2$, Co(BF$_4$)$_2$, MoCl$_5$, (NH$_4$)$_2$OsCl$_6$, NbCl$_5$, WCl$_6$. The first electrode having immobilized π-conjugated ligands obtained in Example 2 was immersed in an ethanol solution of one of the aforementioned compounds, the system was heated and optionally shaken, metal ions were coordinated to the second π-conjugated ligands, and a first electrode having immobilized π-conjugated metal complexes (i.e., electrode having immobilized second π-conjugated ligand—metal ion complexes) was obtained. The obtained first electrode having immobilized π-conjugated metal complexes was washed with an ethanol solution. Further, an ethanol solution of 2,2':6',2''-terpyridine or a chloroform solution of 4',4''''(1,4-phenylene)bis(2,2':6',2''-terpyridine) was prepared as the second ligand (ligand (B)), the first electrode having immobilized π-conjugated metal complexes was immersed in the solution, the second electrode having immobilized π-conjugated metal complexes (i.e., electrode having immobilized second π-conjugated ligand—metal ion complexes) was obtained, and this electrode was washed with a solvent containing no ligands.

(2) Preparation of Electrode having Immobilized π-Conjugated Multinuclear Metal Complexes A π-conjugated multinuclear metal complex was prepared in the following manner. The first electrode having immobilized π-conjugated metal complexes prepared in (1) of Example 3 was immersed in a chloroform solution of 4',4''''-(1,4-phenylene)bis(2,2':6',2''-terpyridine) that was the ligand (B) and washed with chloroform. It was then immersed in an ethanol solution of a metal ion to obtain an electrode having immobilized π-conjugated multinuclear metal complexes which was then washed with ethanol. When a structure with a multilayer configuration of immobilized ligands (B) was produced, the operation of immersing into a solution containing the ligands (B) and a solution containing metal ions was repeated.

Example 4, Comparative Example 1

The Effect of Additives was Verified.

(1) Electrochemical Measurements

In the electrochemical device shown in FIG. 3, cyclic voltammogram measurements were conducted under a nitrogen atmosphere by using the electrode having the immobilized π-conjugated ligand metal complexes as a working electrode, a silver/silver chloride (Ag/CgCl) or Ag/Ag$^+$ electrode as a reference electrode, a platinum wire as a counter electrode, and an aqueous solution of sodium chloride or an acetonitrile solution of tetrabutylammonium tetrafluoroborate as an electrolytic solution. In the below-described drawings relating to examples, the description vs Ag/AgCl in the units of electric potential plotted against the abscissa, relates to the case in which a combination of an aqueous solution of sodium chloride and an Ag/AgCl electrode was used, and the description Ag/Ag$^+$ relates to the case in which a combination of an acetonitrile solution of tetrabutylammonium tetrafluoroborate and an Ag/Ag$^+$ electrode was used.

The first electrode having the immobilized π-conjugated metal complexes was produced by using TRITON X-100 (trade name) as an additive in Example 4-(1), sodium benzenesulfonate as an additive in Example 4-(2), sodium dodecylsulfate as an additive in Example 4-(3), sodium deoxycholate as an additive in Example 4-(4), and aniline as an additive in Example 4-(5). In Comparative Example 1, the first electrode having the immobilized π-conjugated metal complexes was produced without using an additive.

The reference electrodes used are described on the abscissa of each graph. The operation rate was 200 mVs$^{-1}$.

(2) Results

The results obtained in electrochemical measurements are described below.

(2)-1. Effect of Additive

Figure 4:
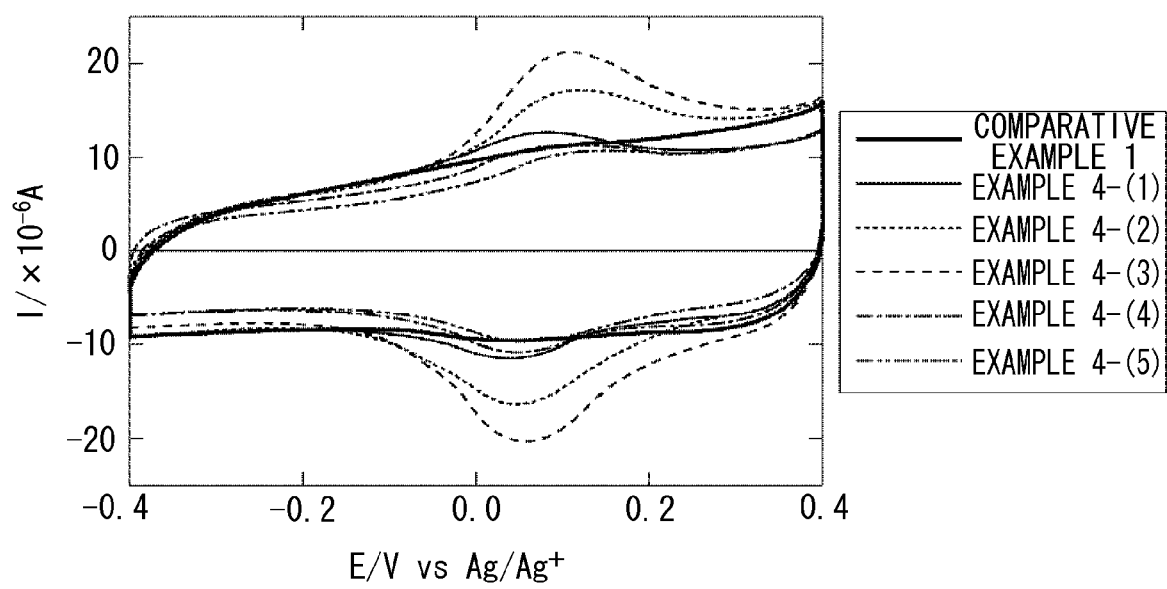
FIG. 4 shows the results obtained in Example 4 and Comparative Example 1.

FIG. 4 shows a graph relating to the effect of an additive that is added to an aqueous solution. In the figure, electric current is plotted against the ordinate, and electric potential is plotted against the abscissa.

The electrode having immobilized π-conjugated metal complexes was configured by Co$^{2+}$ as a coordinated metal ion, and tetrafluoroborate as a second ligand derived from a starting material or an electrolyte. An acetonitrile solution of tetrabutylammonium tetrafluoroborate was used as the electrolytic solution during measurements.

A redox wave that was apparently caused by (valence 2)/(valence 3) of Co was observed from the electrode using the additives of Examples 4-(1) to 4-(5) in this graph. On the other hand, no current was observed from the electrode of Comparative Example 1 to which no additive was added.

The results indicated that the metal ion can be coordinated by adding an additive.

Example 5

The Effective Additive Concentration was Verified.
(1) Additive Concentration

Figure 5A:
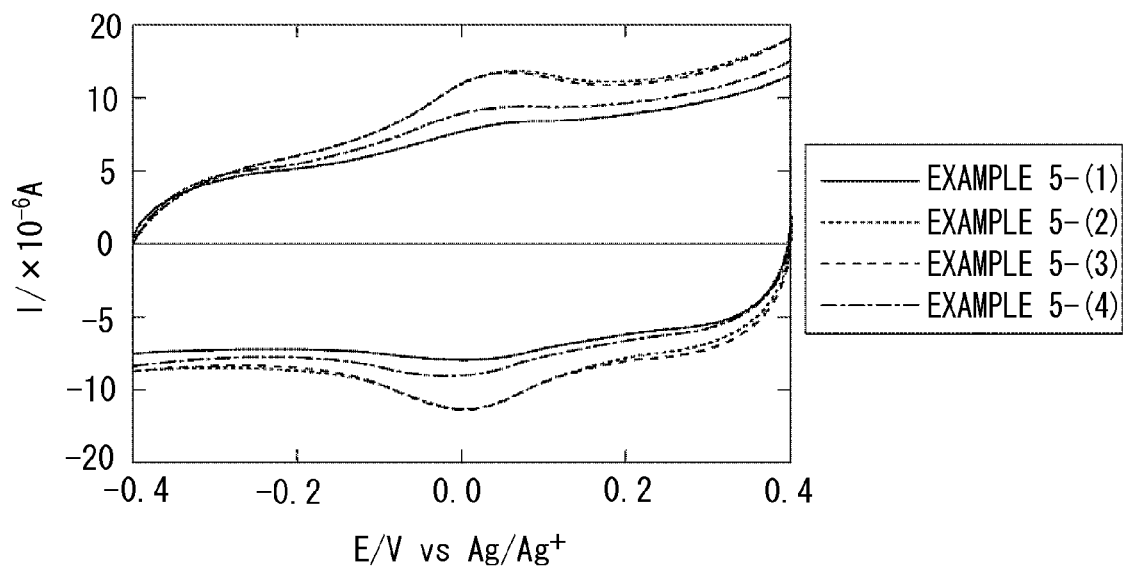
FIGS. 5A and 5B show the results obtained in Example 5.
Figure 5B:
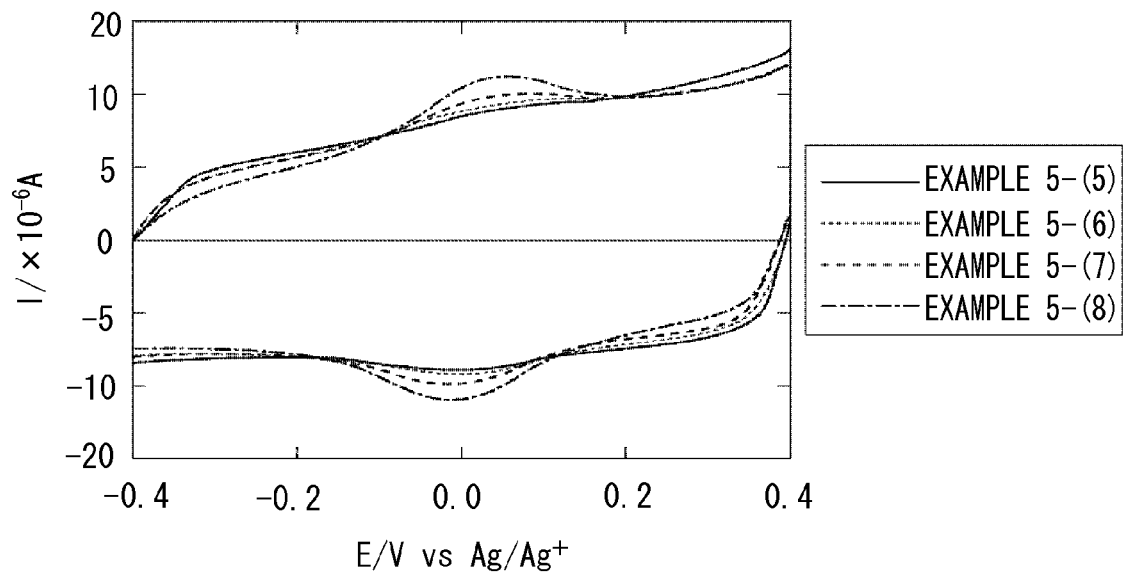

FIGS. 5A and 5B show graphs illustrating the effect of additive concentration in the aqueous solution. In the graph, electric current is plotted against the ordinate, and electric potential is plotted against the abscissa. In this case, FIG. 5A represents a system using sodium dodecylsulfate as the additive, and FIG. 5B—a system using sodium benzenesulfonate. The meaning of symbols in the graph is described below. In FIG. 5A, Example 5-(1) represents the case in which the molar ratio of π-conjugated ligand to the additive is 0.01, Example 5-(2)—the case in which the molar ratio is 0.1, Example 5-(3)—the case in which the molar ratio is 1, and Example 5-(4)—the case in which the molar ratio is 10. In FIG. 5B, Example 5-(5) represents the case in which the molar ratio of π-conjugated ligand to the additive is 1, Example 5-(6)—the case in which the molar ratio is 10, Example 5-(7)—the case in which the molar ratio is 100, and Example 5-(8)—the case in which the molar ratio is 1000.

In this case, $Co^{2+}$ was used as a coordinated metal ion and tetrafluoroborate derived from a starting material of metal ion or an electrolyte was used as a second ligand. An acetonitrile solution of tetrabutylammonium tetrafluoroborate was used as the electrolytic solution during measurements.

A redox wave that was apparently caused by (valence 2)/(valence 3) of Co in the graph confirmed that good results are provided with a molar ratio of π-conjugated ligand to the additive that is equal to or higher than 0.1 and equal to or lower than 1, in the system using sodium dodecylsulfate, and that is equal to or higher than 100, in the system using sodium benzenesulfonate.

Example 6

Figure 6A:
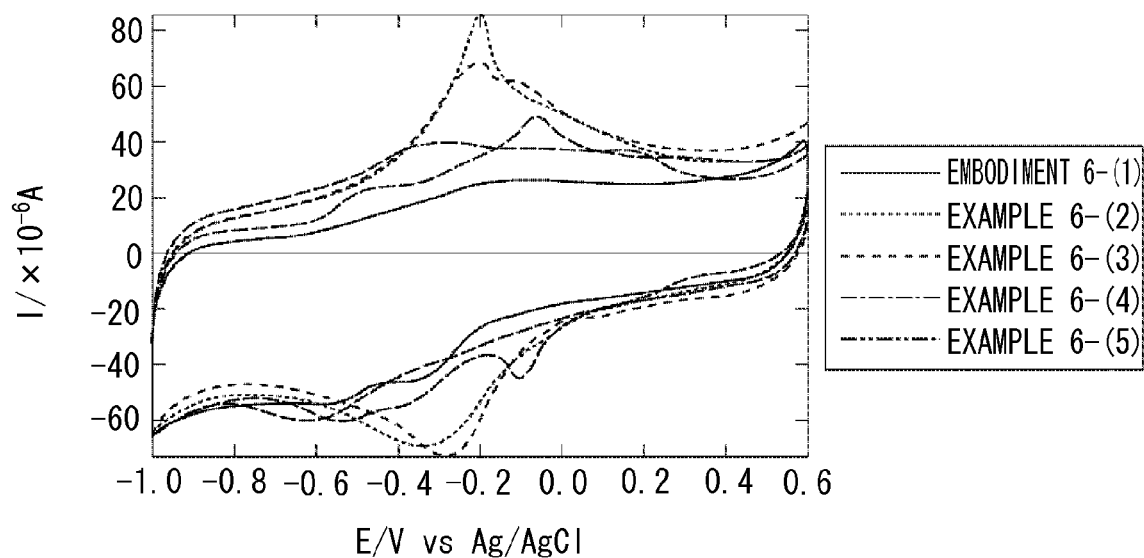
FIGS. 6A and 6B show the results obtained in Example 6.
Figure 6B:
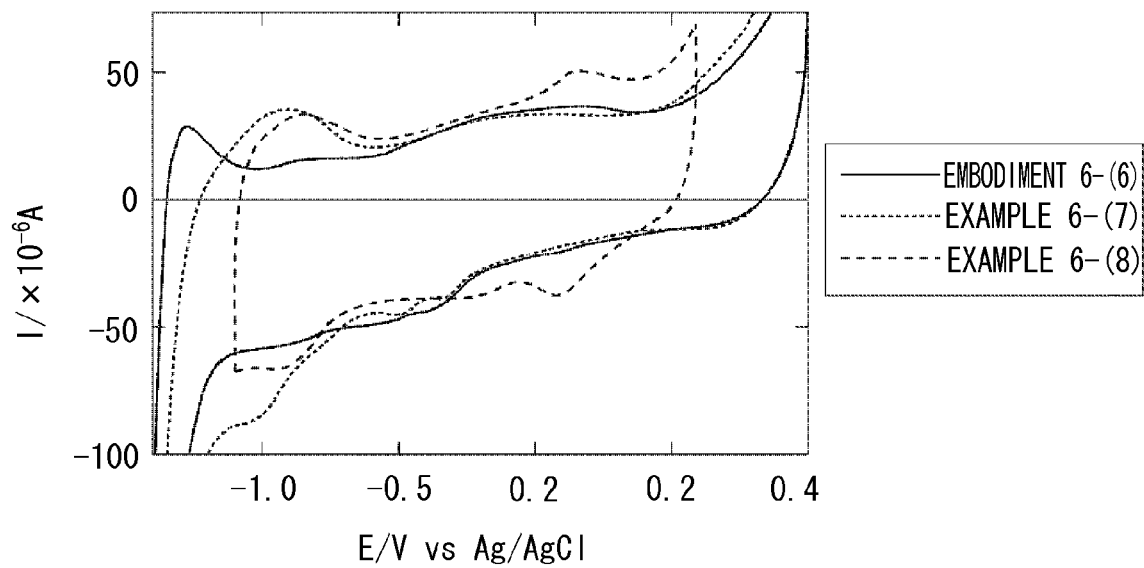

Electrodes having immobilized π-conjugated metal complexes were produced by immobilizing various metal ions on the electrode having immobilized π-conjugated ligands, and the effects obtained were verified.
(1) Effect of Metal Ions FIGS. 6A and 6B show cyclic voltammogram measurement results obtained for electrodes having immobilized π-conjugated complexes, in which various metal ions were immobilized on the π-conjugated ligands of the first electrode having immobilized π-conjugated molecules. In the graph, electric current is plotted against the ordinate, and electric potential is plotted against the abscissa. FIG. 6A shows the results relating to a system using ions of Cu, Sn, Os, Fe as the metal ion, and FIG. 6B—a system using ions of Ni and Co.

The meaning of reference symbols in the graph will be described below.

In FIG. 6A, Embodiment 6-(1) represents the case in which no metal ion was coordinated, Example 6-(2)—the case in which Cu ions were coordinated, Example 6-(3)—the case in which Sn ions were coordinated, Example 6-(4)—the case in which Os ions were coordinated, and Example 6-(5)—the case in which Fe ions were coordinated.

In FIG. 6B, Embodiment 6-(6) represents the case in which no metal ion was coordinated, Example 6-(7)—the case in which Ni ions were coordinated, and Example 6-(8)—the case in which Co ions were coordinated.

The conditions of the experiment in this case is as follows.

Sodium dodecylsulfate was used as the additive, the anion of the metal salt serving as a starting material or a chloride ion derived from the electrolyte was used as the ligand (A). When the central metal was Ni, 4',4''''-(1,4-phenylene)bis(2,2':6',2''-terpyridine) was used as the ligand (A). An aqueous solution of NaCl was used as the electrolytic solution during measurements.

FIGS. 6A and 6B show that the coordination of metal ions of Cu, Sn, Os, Fe, Ni, and Co changes the redox behavior. This result confirmed that these metal ions were coordinated to the ligand (A) by immersing the electrode having the immobilized π-conjugated ligands in these metal salt solutions.

Example 7, Comparative Example 2

Figure 7A:
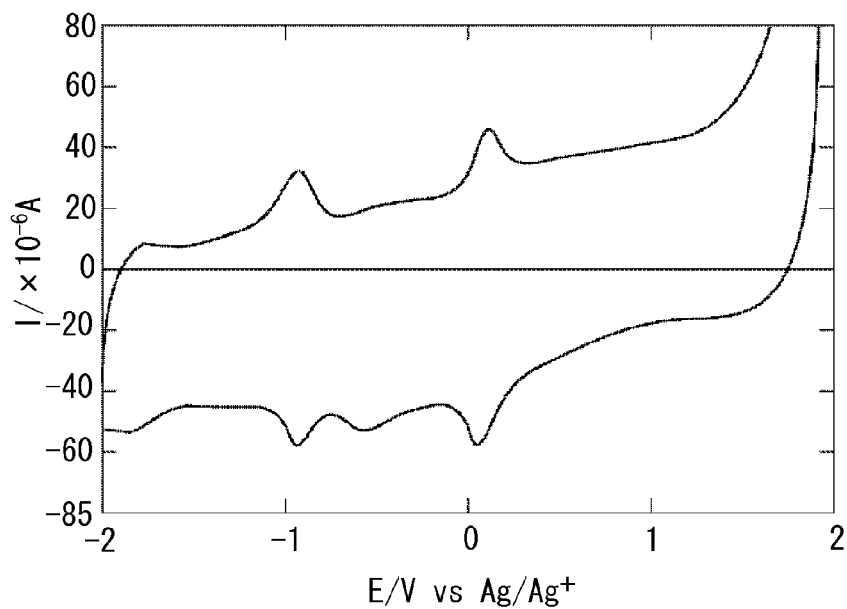
FIGS. 7A and 7B show the results obtained in Example 7 and Comparative Example 2.

(1) Evaluation of Stability of the Electrode having Immobilized π-Conjugated Metal Complexes FIG. 7A shows cyclic voltammogram measurement results obtained for an electrode having immobilized π-conjugated complexes. In the graph, electric current is plotted against the ordinate, and electric potential is plotted against the abscissa.

In this case, $Co^{2+}$ was used as a coordinated metal ion, and tetrafluoroborate derived from a starting material or an electrolyte was used as the ligand (A). An acetonitrile solution of tetrabutylammonium tetrafluoroborate was used as the electrolytic solution (in other words, the aqueous solution) during measurements.

This graph confirms that for the electrode having immobilized π-conjugated metal complexes using the production method in accordance with the present invention, electrochemical measurements are possible within an electric potential range of from −2 to +1.2 V vs Ag/Ag+ in the acetonitrile solution, and the graph shown in FIG. 6B confirms the possibility of measurements within a range of from −1.2 to +0.6 V vs Ag/AgCl in the aqueous solution.

Figure 7B:
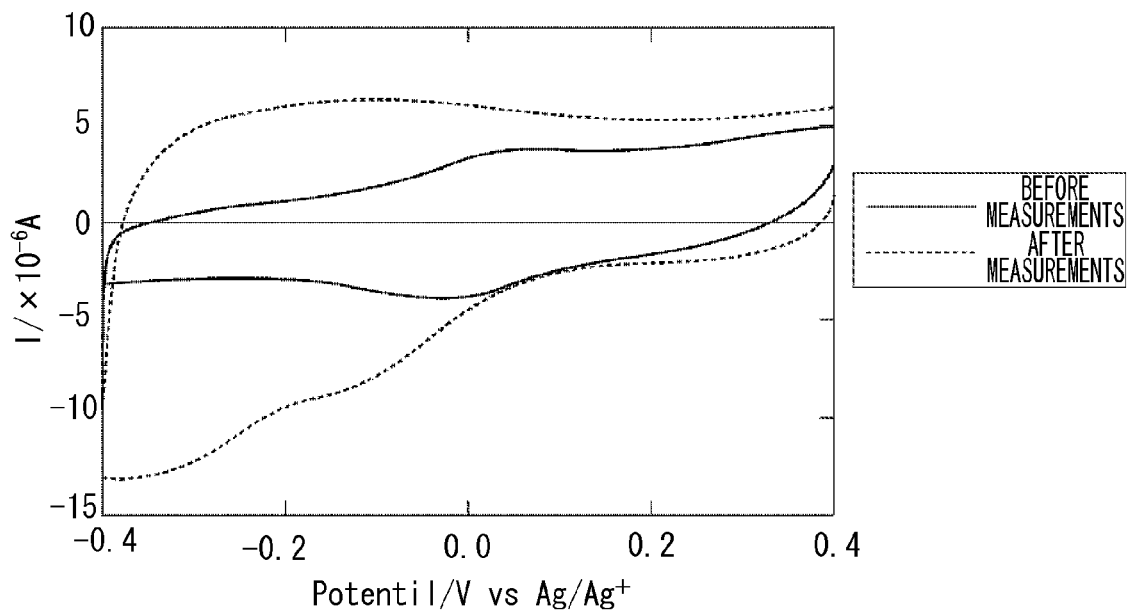

In Comparative Example 2, an acetonitrile solution of tetrabutylammonium tetrafluoroborate as employed in Example 4 was used to conduct the measurements within the same electric potential range with an electrode using a gold base material, 4'-(4-thiophenyl)-2,2':6',2''-terpyridine as a ligand, and cobalt as a metal ion. In this case, as shown in FIG. 7A, a relatively strong background current that was believed to be caused by the reactions of solvent, electrolyte, and the like was observed, and a redox wave originating from the complex could not be confirmed. FIG. 7B shows a cyclic voltammogram of the electrode having immobilized cobalt complexes before and after the measurements. The measurements confirmed that the complex redox wave originating from the complex has disappeared.

Thus, it is clear that the electric potential range in which measurements can be conducted with the electrode having immobilized π-conjugated metal complexes in accordance with Example 7 is wider than that of the electrode having immobilized π-conjugated ligands in which π-conjugated ligands having a thiol groups, are immobilized on a base material.

Example 8

Figure 8:
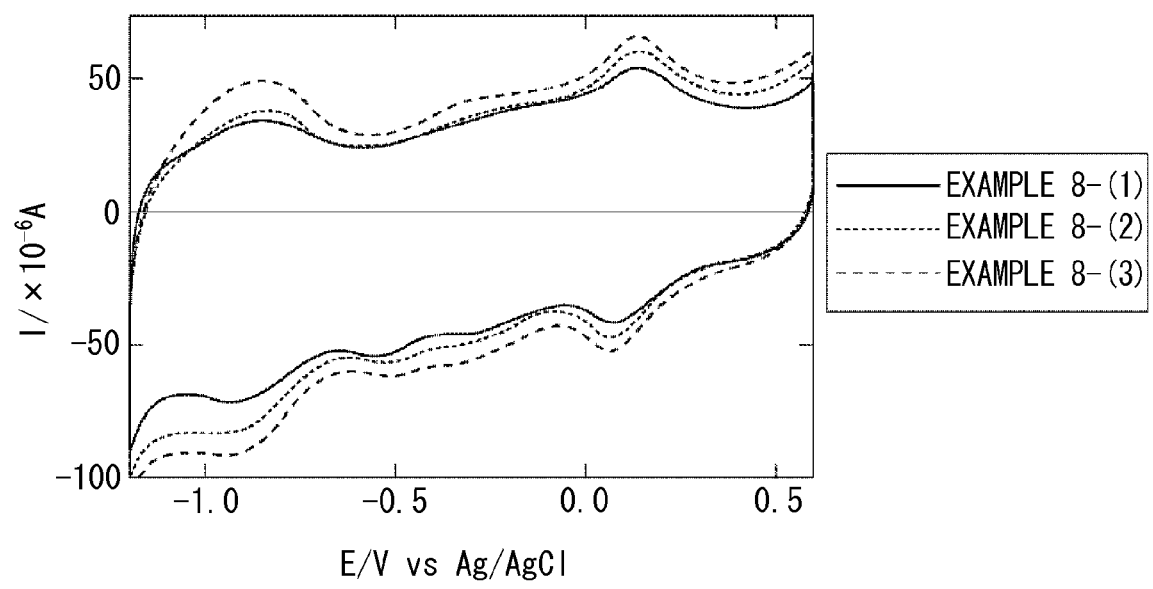
FIG. 8 shows the results obtained in Example 8.

The effect of immobilization of π-conjugated multinuclear metal complexes produced in Example 3-(2) was verified.
(1) Effect of π-Conjugated Multinuclear Metal Complexes FIG. 8 shows cyclic voltammogram measurement results obtained for an electrode having immobilized π-conjugated multinuclear metal complexes. In the graph, electric current is plotted against the ordinate, and electric potential is plotted against the abscissa.

The meaning of reference symbols in the graph will be described below.

In the figure, Example 8-(1) represents the case of a mononuclear complex (one layer), Example 8-(2)—the case of a multinuclear (two layers) complex, and Example 8-(3)—the case of a multinuclear (three layers) complex.

The multinuclear complexes were formed using sodium dodecylsulfate as the additive, $Co^{2+}$ as a coordinated metal ion in all the layers, and 4',4''''-(1,4-phenylene)bis(2,2':6',2''-terpyridine) as the ligand (B) in all the layers. An aqueous solution of NaCl was used as the electrolytic solution during measurements.

FIG. 8 confirms that a redox signal increases and the electrode having immobilized π-conjugated molecules becomes multinuclear, with the increase in the number of layers (one layer, two layers, three layers).

Example 9

Verification of production of an electrode having immobilized π-conjugated ligands and an electrode having immobilized π-conjugated metal complexes by an electroless method and the effect obtained.

An aqueous solution of $NaNO_2$ and a hydrochloric acid solution of the compound represented by Formula (1) were mixed and reacted on ice. The reaction solution was added to a phosphoric acid buffer solution of sodium dodecylsulfate. The first electrode having immobilized π-conjugated ligands was prepared by using glassy carbon plate polished with alumina as the base material, immersing the glassy carbon plate in the prepared aqueous solution, and then washing with water. The coordination of metal ions on the first electrode having immobilized π-conjugated ligands was carried out by the method of Example 3. $Co^{2+}$, $Fe^{2+}$ were used as the metal ions.

Figure 9A:
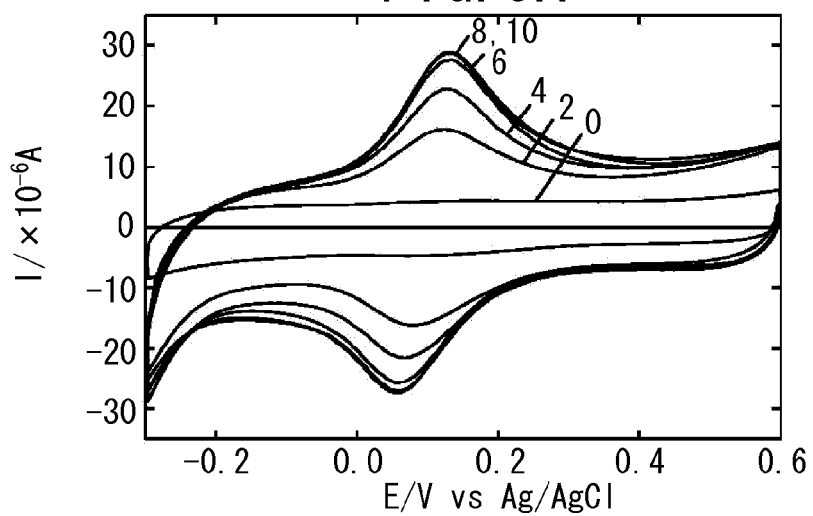
FIGS. 9A to 9C show the results obtained in Example 9.
Figure 9B:
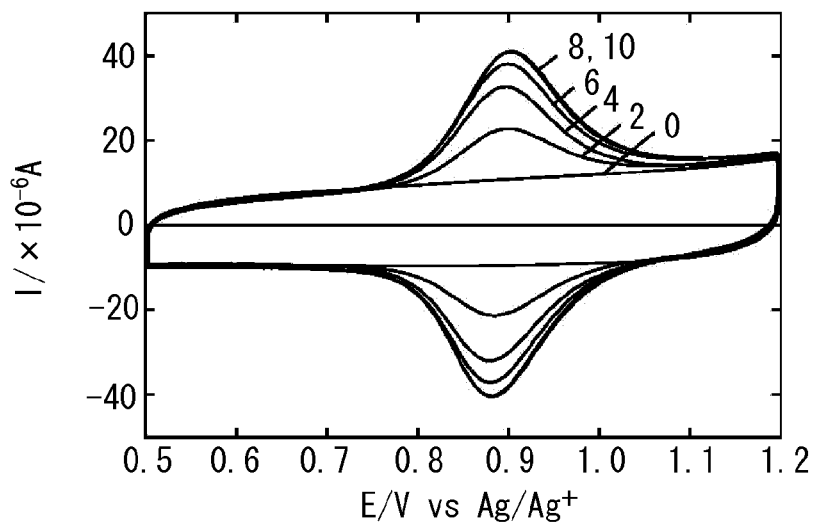
Figure 9C:
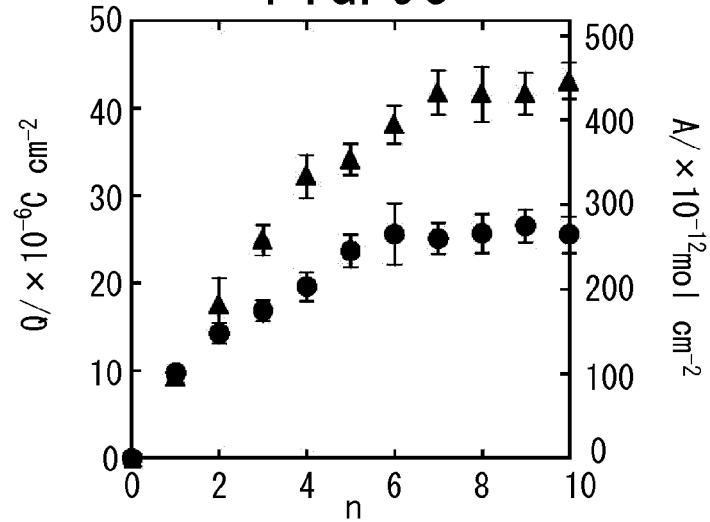

FIGS. 9A to 9C show measurement results obtained in cyclic voltammogram when the operation where the first electrode having immobilized π-conjugated ligands was immersed in each of the metal ion solution and solution of ligand (B) and washed, is repeated. In FIGS. 9A to 9C, electric current is plotted against the ordinate, and electric potential is plotted against the abscissa. FIG. 9A shows the results obtained when $Co^{2+}$ was used as the metal ion, and FIG. 9B shows the results obtained when $Fe^{2+}$ was used. The numbers in the graphs represent the number of immersions in the metal ion solution and solution of ligand (B). The first electrode having immobilized π-conjugated ligands was immersed the same number of times in the metal ion solution and solution of ligand (B), and the case in which the electrode was immersed once in each of the metal ion solution and solution of ligand (B) is denoted by "1". Each graph represents a quasi-reversible redox wave, and respective half-wave potentials correspond to bis(terpyridyl) complex using each metal. FIG. 9C shows the relationship between the number of immersions in each of the metal ion solution and solution of ligand (B) (plotted against the abscissa), the electric charge density calculated from the cyclic voltammogram (left axis Q), and the adsorption density of molecules (right axis A). The symbol is a circle in the case $Co^{2+}$ was used as the metal ion and a triangle when $Fe^{2+}$ was used.

FIGS. 9A to 9C confirm that a redox signal increases with the increase in the number of layers (e.g., one layer, two layers, three layers), and that the electrode having immobilized π-conjugated metal complexes becomes multinuclear even in the case of the electrode having immobilized π-conjugated ligands that are obtained by an electroless method.

Example 10, Comparative Examples 3, 4, 5

Verification of immobilization of π-conjugated ligands on substrate by X-ray photoelectron spectroscopy.

An electrode having immobilized π-conjugated ligands was prepared using the method of Example 9 (Example 10). Likewise, an electrode formed of only a glassy carbon plate polished with alumina was used in Comparative Example 3. In order to confirm that immobilization of π-conjugated ligands on a carbon substrate proceeds via a diazonium compound, an electrode having immobilized π-conjugated ligands of Comparative Example 4 was obtained by the same method as the electrode having immobilized π-conjugated ligands of Example 9, except that $NaNO_2$ was removed from the aqueous solution. In order to confirm that the compound immobilized on the glassy carbon plate has a terpyridine structure, an ethanol solution of terpyridine was dropped on the glassy carbon plate and dried to prepare a sample of Comparative Example 5.

Figure 10:
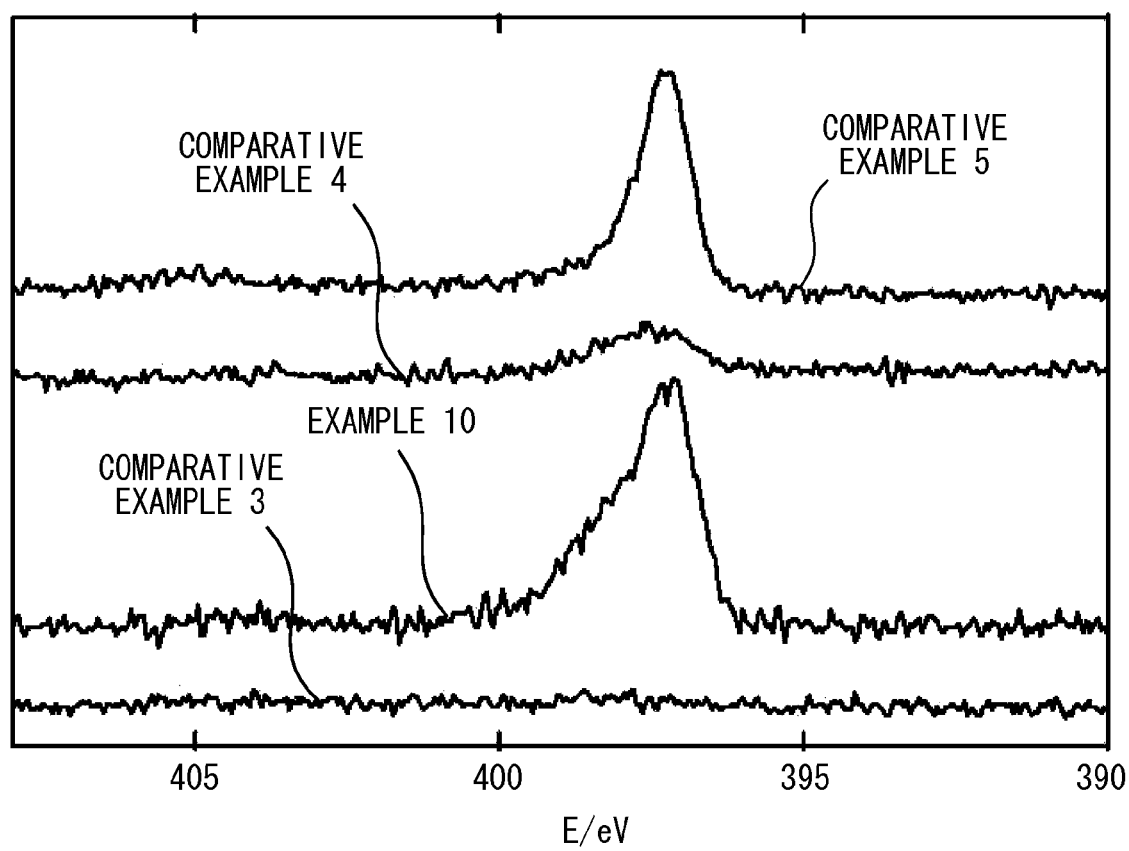
FIG. 10 shows the results obtained in Example 10 and Comparative Examples 3, 4, and 5.

FIG. 10 shows an XPS spectrum of a nitrogen 1s region of GC substrates of four types. The count normalized by the integral value of the C1s peak of the glassy carbon substrate is plotted against the ordinate in FIG. 10. The bond energy is plotted against the abscissa. From the sample of Comparative Example 3, practically no signal was observed in the bond energy region of nitrogen 1s region. From the sample of Example 10, a main signal having 397 eV as a peak was observed. From a sample of Comparative Example 4, a weak broad signal centered on 398 eV was observed. From a sample of Comparative Example 5, a clear signal having 397 eV as a peak was observed.

The comparison of Comparative Example 3 and Example 10 confirms that a compound including a nitrogen atom was immobilized on the base material of Example 10. The comparison of Comparative Example 4 and Example 10 demonstrates that when $NaNO_2$ was not added, the nitrogen compound practically was not immobilized on the substrate. Further, the nitrogen compound demonstrates an XPS spectrum analogous to that of Comparative Example 5. These results suggest that in Example 10, the π-conjugated ligands were immobilized on the substrate via a diazonium salt produced by a reaction of the compound represented by Formula (1) and $NaNO_2$.

Example 11 and Comparative Example 6

Verification of immobilization of π-conjugated ligands and π-conjugated metal complexes on substrate by atomic force microscopy.

An electrode having immobilized π-conjugated ligands (Example 11-(1)) and an electrode having immobilized π-conjugated metal complexes (Example 11-(2)) were prepared by same method as that of Example 9 by using a highly oriented pyrolyzed graphite instead of glassy carbon as a base material. An electrode of Comparative Example 6 was formed only of highly oriented pyrolyzed graphite (Comparative Example 6). In this case, $Fe^{2+}$ was used as a metal ion, and the electrode having immobilized π-conjugated ligands was immersed once in each of the metal ion solution and solution of ligand (B) and washed. The height of the π-conjugated ligands and π-conjugated metal complexes was estimated by a scratch method.

Figure 11A:
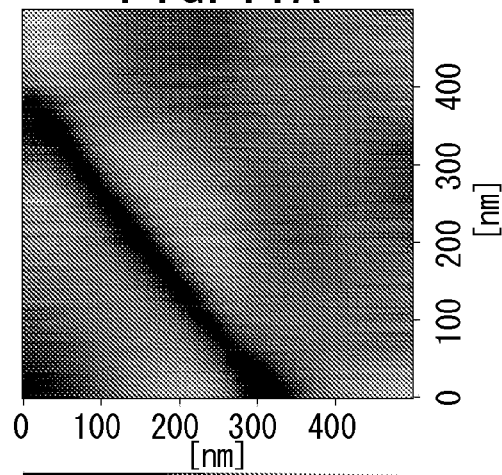
FIGS. 11A to 11C show the results obtained in Example 11 and Comparative Example 6.
Figure 11B:
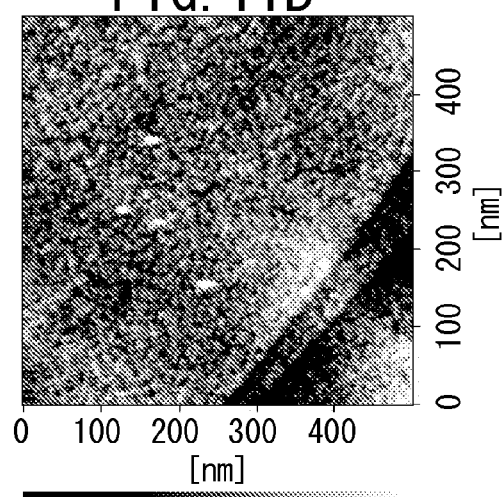
Figure 11C:
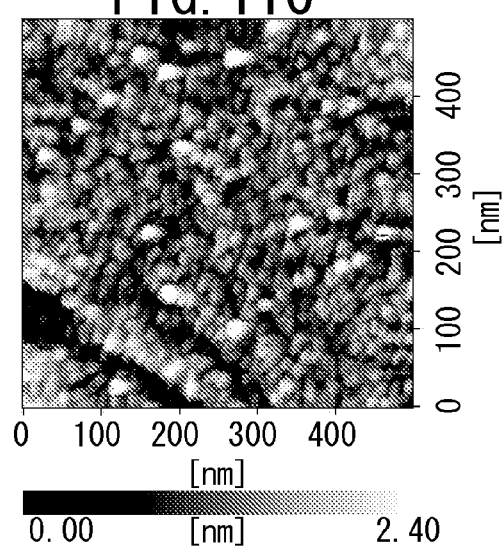

FIGS. 11A to 11C show atomic force microscopic images of HOPG substrates of three different kinds. In Comparative Example 6 shown in FIG. 11A, a smooth surface of the HOPG substrate and a step were observed. In Example 11-(1) shown in FIG. 11B an image was observed in which a granular substance with a diameter equal to or less than 10 nm was formed on one surface of the HOPG. The height of this substance as estimated by the scratch method was 1.7 nm. In Example 11-(2) shown in FIG. 11C, an image was obtained in which a granular substance had a large diameter of 10-20 nm. The height thereof was about 2.4 nm.

Computations using molecular computation software estimated the height of the π-conjugated ligand from the carbon atom on the substrate as 1.2 nm. The value observed in the scratch method was by a factor of 1.3 larger. In this case the probability of π-conjugated ligand molecules being immobilized on the carbon base material in a single layer or two molecular layers was higher than that of the multilayer configuration. Further, the height of the complex computed in a similar manner was 2.4 nm. This result matched well the value observed by the scratch method. The above-described observations confirmed that the π-conjugated ligands and π-conjugated metal complexes have been immobilized on the substrate.

By using the method for producing an electrode having immobilized π-conjugated ligands in accordance with the above-described examples, it may be possible to produce an electrode having immobilized π-conjugated ligands that enables the coordination of metal ions on a base material, for example with the immobilization of π-conjugated ligands with a spacing that allows a π-conjugated complex to be formed. The method in accordance with the above-described examples may also provide an electrode having relatively high electron transfer capacity of the π-conjugated molecules, and relatively high electrochemical stability. These features can be used in the following manner.

1. When an electrode having immobilized π-conjugated complexes prepared in accordance with the above-described examples is used as an electric wiring or in devices employed as mediators, in a system in which the electron transfer of the complex becomes a rate-determining process, the amount of electric charge, that is, the electric current flowing in the complex within a fixed interval, may be increased. As a result, the device performance may be improved. For example, where the device is a sensor, it may be possible to provide a sensor with a relatively high upper limit of a concentration measurement range. In the case of energy devices, it may be possible to provide an energy device with a relatively high current and a relatively high output that is proportional to the current.

2. When an electrode having immobilized π-conjugated metal complexes prepared in accordance with the above-described examples is used as an electric wiring or in devices employed as mediators, in a system in which the electron transfer of the complex becomes a rate-determining process, the number of molecules needed to provide the constant current thereof may be decreased. As a result, the device can be reduced in size. Furthermore, because the amount of substance provided may be decreased, the cost can also be reduced.

3. When an electrode having immobilized π-conjugated metal complexes prepared in accordance with the above-described examples is used as an electric wiring or in devices employed as mediators, in the case of a system in which the device service life is relatively short or when the amount of noise is relatively large due, by forming an electrochemically stable electrode having immobilized π-conjugated complexes, it may be possible to reduce the amount of noise and extend the device service life.

Examples of devices in which these features can be employed include sensors using enzyme electrodes and biofuel cells.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-328717 filed Dec. 20, 2007, and 2008-281861 filed Oct. 31, 2008 which are hereby incorporated by reference herein in their entirety.

What is claimed is:

1. A method for producing an electrode having immobilized π-conjugated ligands, the method comprising:
bringing an aqueous solution into contact with an electrically conductive base material, the aqueous solution comprising π-conjugated ligands having the ability to bind to a metal ion by coordination to form a coordination complex, and at least one of (i) a surfactant, and (ii) a water-soluble molecule having a structure different from that of the π-conjugated ligands, the water-soluble molecule having a π-conjugated structure; and
immobilizing the π-conjugated ligands on the base material.

2. The method for producing the electrode having immobilized π-conjugated ligands according to claim 1, wherein the electrically conductive base material comprises a carbon material.

3. The method for producing the electrode having immobilized π-conjugated ligands according to claim 1, wherein the π-conjugated ligands are immobilized on the base material by electro-reduction.

4. The method for producing the electrode having immobilized π-conjugated ligands according to claim 1, wherein the π-conjugated ligands comprise a diazonium compound.

5. The method for producing the electrode having immobilized π-conjugated ligands according to claim 1, wherein immobilization of the π-conjugated ligands on the base material occurs simultaneously with bringing the aqueous solution into contact with the base material.

6. A method for producing an electrode having immobilized π-conjugated ligands, the method comprising:
bringing an aqueous solution into contact with an electrically conductive base material, the aqueous solution comprising π-conjugated ligands comprising molecules comprising at least one of terpyridine, bipyridine, phenanthroline, porphyrin, phthalocyanine, and derivatives thereof, and at least one of (i) a surfactant, and (ii) a water-soluble molecule having a structure different from that of the π-conjugated ligands, the water-soluble molecule having a π-conjugated structure; and
immobilizing the π-conjugated ligands on the base material.

* * * * *